Figure 1:
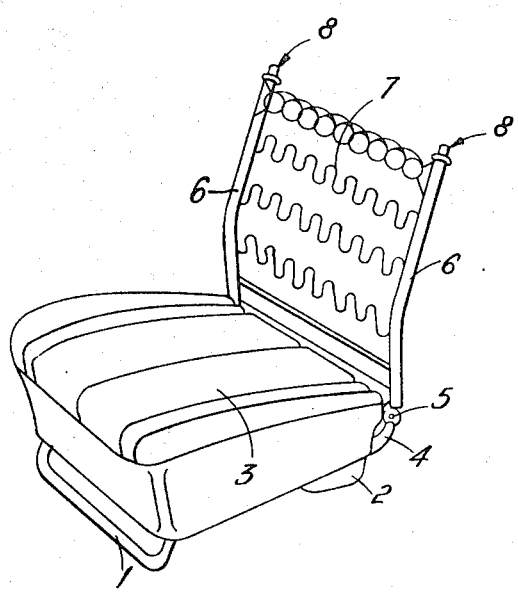

United States Patent

[11] 3,545,808

[72] Inventors Ernst Gescheidle
     Gross-Gerau, Germany;
[21] Appl. No. 763,188
[22] Filed Sept. 27, 1968
[45] Patented Dec. 8, 1970
[73] Assignee General Motors Corporation
     Detroit, Mich.
     a corporation of Delaware
[32] Priority Nov. 8, 1967
[33] Germany
[31] No. P1,630,891.1

[54] MOTOR VEHICLE SEAT
     7 Claims, 5 Drawing Figs.
[52] U.S. Cl. .................................................. 297/216,
     297/454, 297/460
[51] Int. Cl. ................................................... A47c 7/02,
     B60v 21/00; B60n 1/02
[50] Field of Search ......................................... 297/216,
     445, 451, 452, 455, 459, 460

[56] References Cited
UNITED STATES PATENTS

| | | | |
|---|---|---|---|
| 2,959,207 | 11/1960 | Brewster ...................... | 297/216 |
| 3,206,250 | 9/1965 | Komenda ..................... | 297/456 |
| 3,437,367 | 4/1969 | Blank ............................ | 297/216 |
| 3,446,469 | 5/1969 | Whitten ........................ | 297/216X |
| 3,460,791 | 9/1969 | Judd ............................. | 297/216X |

Primary Examiner—Casmir A. Nunberg
Attorneys— E. J. Biskup and J. L. Carpenter

ABSTRACT: A vehicle seat having a backrest provided with laterally spaced uprights which extend substantially up to the top edge of the backrest and possess a resistance moment of a certain magnitude matching the pressure exerted by the back of the seat occupant upon the backrest. The seat is characterized in that the uprights are provided with energy absorbing means which, during impact on the uprights in the direction of their longitudinal axis, cause them to become shortened.

PATENTED DEC 8 1970

3,545,808

Inventor
Ernst Gescheidle
BY E. J. Biskup
Attorney

MOTOR VEHICLE SEAT

The invention relates to a seat for motor vehicles having a backrest provided with lateral uprights which extend substantially up to the top edge of the backrest and which possess a resistance moment of certain magnitude matching the pressure exerted by the back of the vehicle occupant upon the backrest.

More specifically, the invention proposes to provide the uprights of a seat backrest of the above-described type with energy absorbing or consuming means which, during impact on the uprights in the direction of their longitudinal axis, cause them to become shortened at least in such a manner that a maximum stipulated retardation does not exceed a certain time duration.

This energy absorbing means consists appropriately of deformable parts which are applied to each upright or are inserted between two upright portions.

An advantageous embodiment of the invention is attained by mounting a hollow plug-shaped part consisting of thermoplastic synthetic material on the tubular upright open at the top. This part consists of a shank, projecting into the upright, a bead resting on the profiled edge of the upright and a cap-shaped portion protruding upwardly out of the upright. In the case of this plug-shaped part, it is essential for its height and its wall thickness to be in a suitable relation to each other, depending upon the material.

Very good values with regard to the effect aimed at are attained if, according to a further feature of the invention, a tubular member is telescopically inserted with a press fit, into each upright, this inserted tubular member possibly consisting of thinner sheet metal than the upright, or of expanded metal or of plastic.

A further possibility of attaining the desired effect consists in providing the upright with cavities over a certain length, in such a way that they permit a compression of the upright.

Figure 2:
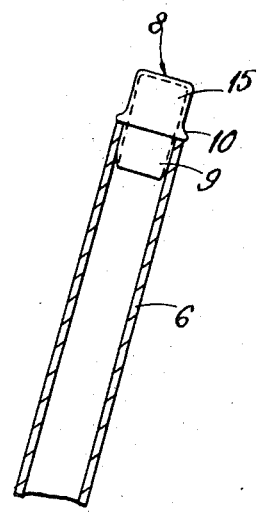

The invention will be explained in further detail with the aid of embodiments by way of example, by referring to the accompanying drawing in which:

FIG. 1 shows a vehicle seat having the backrest uprights according to the invention, but with the upholstery removed;

FIG. 2 an enlargement of the upper end of the backrest upright of FIG. 1.

Figure 3:
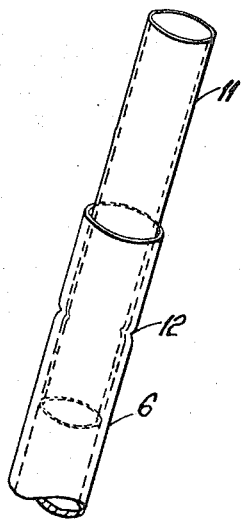
Figure 4:
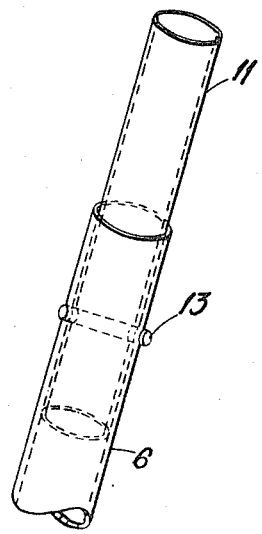
Figure 5:
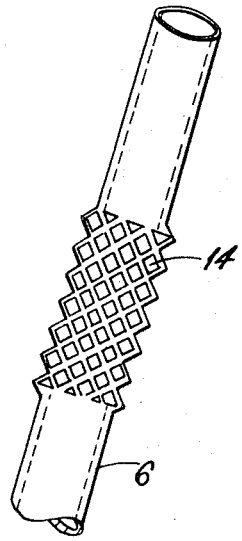

FIGS. 3 to 5 illustrate the upper end of an upright with further constructions according to the invention.

The vehicle seat is provided with a front bow member 1 and with rear supporting parts 2 by which it is secured to a device mounted on the vehicle floor, or by which it rests on the latter. The seat cushion 3 as well as the spring core are secured on a frame portion 4 in well-known manner. The backrest uprights 6 are connected with this frame portion 4, either rigidly or through a joint 5. The springing arranged between the uprights 6 is denoted by 7. The uprights 6 extend approximately up to the top edge of the backrest which is formed by the upholstery (not shown). These uprights must have a certain resistance moment, i.e., they must be relatively stiff, so that they can resist the pressure exerted by the backs of the front seat occupants on the backrests. Hence, the uprights 6 usually consist of a tube.

It will be seen from FIGS. 1 and 2 that the upright 6 is provided with a plug-shaped member 8 which consists of a thermoplastic synthetic material and is inserted into the upright 6 with its shank 9. By means of a cap-shaped portion 15, the plug-shaped member upwardly protrudes out of the upright 6. The plug-shaped member 8 is made in hollow construction. Its wall thickness is such that it is able to deform upon impact in order to attain the desired retardation value. A flange 10 on the plug-shaped member 8 serves to support it at the upper edge of the upright 6. It is easily possible to fit the member 8 at a later date into the backrest or to apply it to the upright 6 in simple manner, if required.

Another appropriate embodiment of the invention is shown in FIG. 3. In this case, a tubular piece 11 is pushed into the tubular upright 6. This tubular piece 11 may consist of thinner sheet metal, expanded metal or plastic. By providing an appropriate press fit between the two parts, an impact upon the piece 11 along the longitudinal axis of the upright 6 is able to create the necessary frictional work for bringing a certain deceleration or retardation to the object causing the impact. The frictional work can be further increased by creating a certain deformation of parts 6 and 11 by means of a punched recess or an annular groove 12. Instead of the circular profile section for the upright 6, any other section may be used, in which case the part 11 is then matched to this section.

In FIG. 4, a tubular piece 11 is again inserted into the upright 6. Upright 6 and part 11 are both provided with bores through which a pin 13 is passed. This pin consists of thermoplastic material and is sheared off when the part 11 is subjected to a blow of appropriate intensity.

A further possible embodiment is shown in FIG. 5 in which the upright 6 is provided with cavities 14 over a portion of its length. A kind of grid is thus created at this portion. Under appropriate shock action on the upright 6, this grid collapses. Again with this formation, the desired effect can be obtained.

Various changes and modifications can be made in this construction without departing from the spirit of the invention. Such changes and modifications are contemplated by the inventor and he does not wish to be limited except by the scope of the appended claims.

I claim:

1. A motor vehicle seat having a backrest comprising: lateral uprights extending upwardly substantially to the top edge of the backrest, the uprights being of sufficient rigidity to withstand the normal forces exerted thereupon by a seated occupant; spring means extending between the uprights; and energy absorbing means located near the upper ends of the uprights for absorbing impact forces longitudinally of the uprights and in doing so decreasing the length of the uprights.

2. A motor vehicle seat having a backrest as recited in claim 1 wherein each upright includes a tubular member having an upper opening and the energy absorbing mean means includes a hollow plug-shaped member of thermoplastic synthetic material mounted within the upper opening in one of the uprights.

3. A motor vehicle seat having a backrest as recited in claim 2 wherein the plug-shaped member includes a shank portion penetrating into the upright, a bead portion resting on the edge of the upright defining the upper opening, and a cap-shaped portion projecting upwardly out of the upright.

4. A motor vehicle seat having a backrest as recited in claim 1 wherein the energy absorbing means includes a tubular member telescopically inserted into one of the uprights with a press fit.

5. A motor vehicle seat having a backrest as recited in claim 4 wherein the upright and the tubular member are deformed to include indentations.

6. A motor vehicle seat having a backrest as recited in claim 4 wherein the upright and the tubular member include aligned apertures receiving a pin of thermoplastic material.

7. A motor vehicle seat having a backrest as recited in claim 1 wherein the energy absorbing means includes portions of the uprights that define cavities in the uprights allowing the decrease in length of the uprights upon impact.